(12) United States Patent
Merlin et al.

(10) Patent No.: US 10,153,792 B2
(45) Date of Patent: Dec. 11, 2018

(54) DIGITAL COMPENSATION FOR ANTENNA LOAD MISMATCH

(71) Applicant: Samsung Electronics Co., Ltd., Gyeonggi-do (KR)

(72) Inventors: Marco Merlin, Valbonne (FR); Albert Cesari-Bohigas, Cambridge (GB); Alexander Thoukydides, Cambridge (GB); Dean Armstrong, Hamilton (NZ)

(73) Assignee: Samsung Electronics Co., Ltd. (KR)

( * ) Notice: Subject to any disclaimer, the term of this patent is extended or adjusted under 35 U.S.C. 154(b) by 896 days.

(21) Appl. No.: 14/193,484

(22) Filed: Feb. 28, 2014

(65) Prior Publication Data
US 2015/0120219 A1     Apr. 30, 2015

Related U.S. Application Data

(60) Provisional application No. 61/897,609, filed on Oct. 30, 2013.

(51) Int. Cl.
*G01R 29/10*     (2006.01)
*H04B 1/04*     (2006.01)

(52) U.S. Cl.
CPC ................... *H04B 1/0458* (2013.01)

(58) Field of Classification Search
CPC .......... H04B 1/0458; H04B 1/04; H04B 1/02; H04B 1/38; H04B 1/40; H03H 7/40
See application file for complete search history.

(56) References Cited

U.S. PATENT DOCUMENTS

| | | | | |
|---|---|---|---|---|
| 4,142,071 | A * | 2/1979 | Croisier | H04B 1/667 704/229 |
| 8,295,845 | B1 * | 10/2012 | Abdollahi-Alibeik | H04B 17/14 455/226.1 |
| 2004/0219884 | A1 * | 11/2004 | Mo | H04B 1/30 455/67.11 |
| 2005/0105642 | A1 * | 5/2005 | Muller | H03F 1/3247 375/296 |
| 2007/0090874 | A1 * | 4/2007 | Sorrells | H03F 1/32 330/10 |

\* cited by examiner

*Primary Examiner* — Mohamed Charioui
*Assistant Examiner* — Jeremy Delozier
(74) *Attorney, Agent, or Firm* — The Farrell Law Firm, P.C.

(57) ABSTRACT

Methods, apparatuses, and systems for using Digital Signal Processing (DSP) to detect, measure, and/or compensate for, antenna load mismatch are described. One method provides a test sweep signal as digital input to a Digital-to-Analog Converter (DAC) in a transmit path ending with an antenna, and determines a transmit transfer function based on the digital input and digital output from an Analog-to-Digital Converter (ADC) in a loopback path which is electrically connected in parallel with a load impedance of the antenna. The determined transmit transfer function may be used for any of detecting, measuring, and compensating for, antenna mismatch.

28 Claims, 10 Drawing Sheets

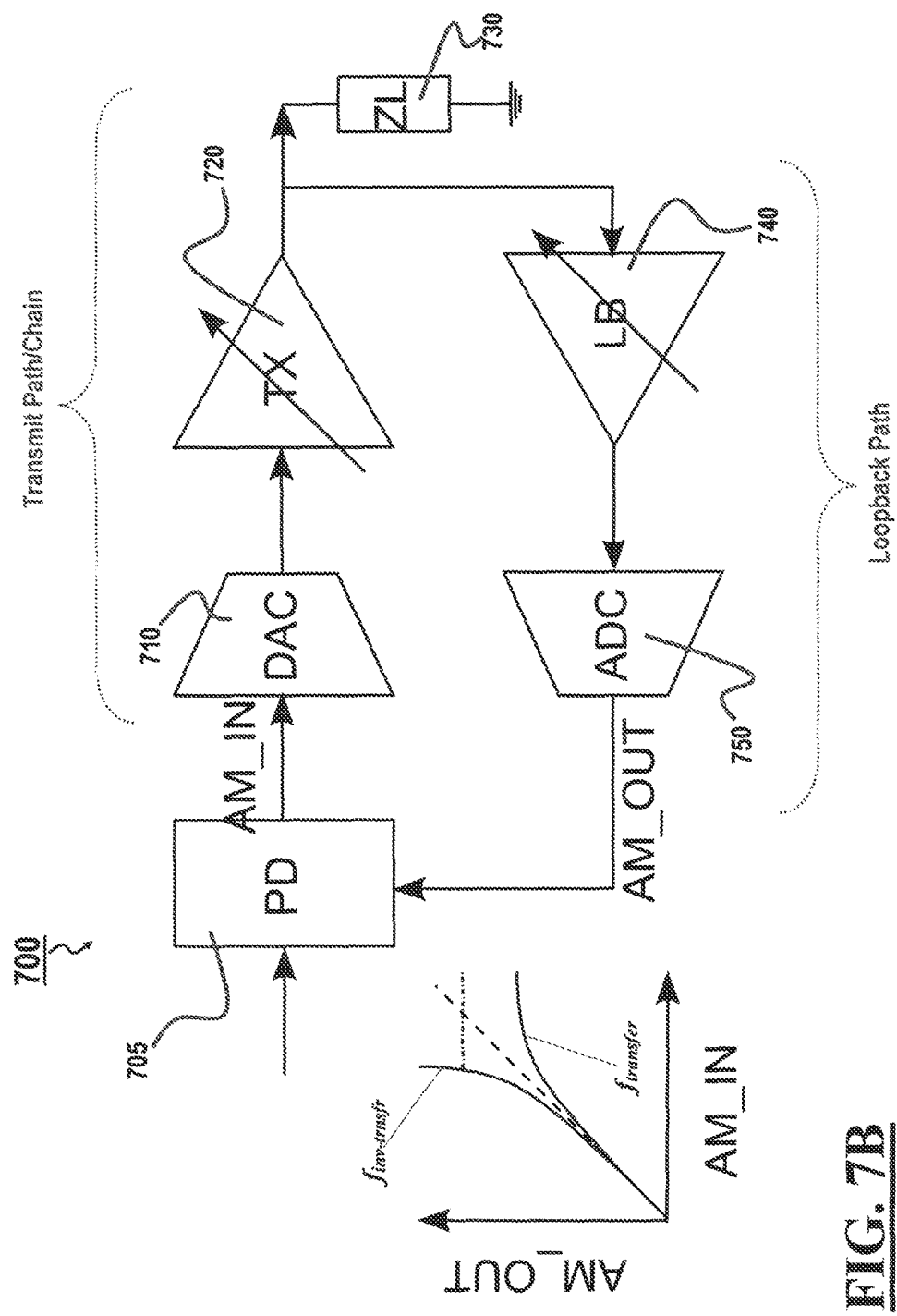

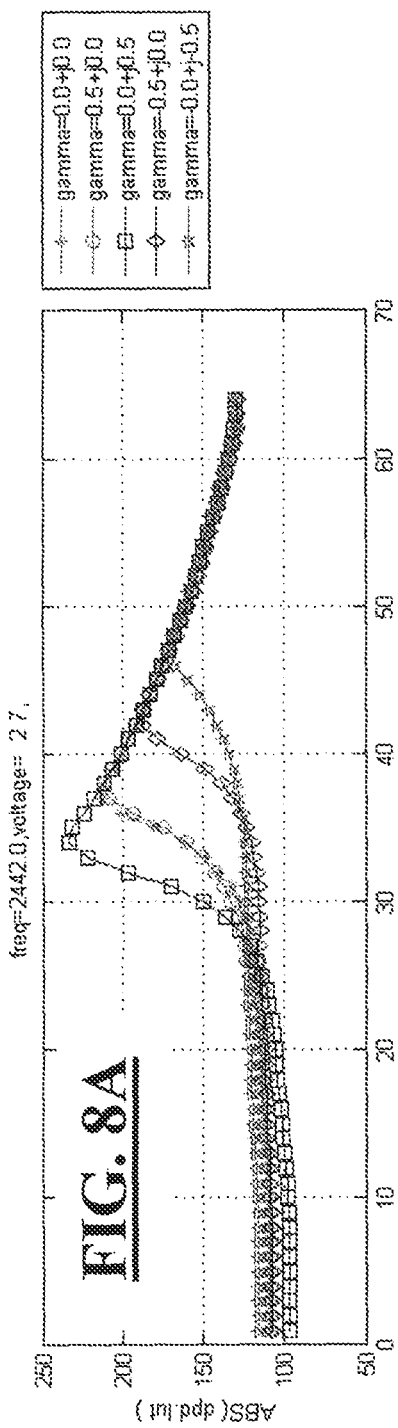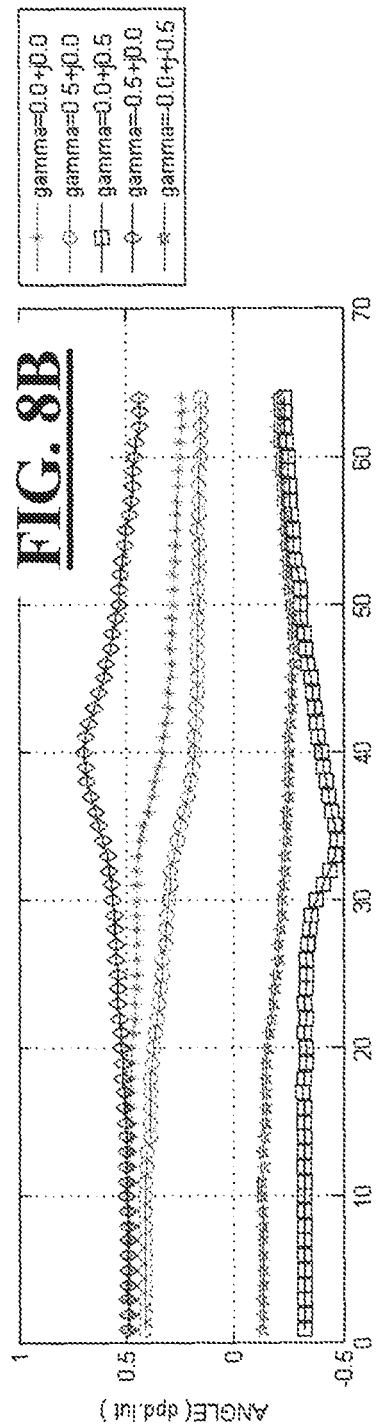

DIGITAL COMPENSATION FOR ANTENNA LOAD MISMATCH

PRIORITY

The present application claims priority under 35 U.S.C. § 119(e) to U.S. Provisional Application No. 61/897,609, entitled "Digital Antenna Load Mismatch Compensation," which was filed on Oct. 30, 2013, the contents of which are incorporated herein by reference.

BACKGROUND OF THE INVENTION

1. Field of the Invention

The present invention relates generally to a digital technique for compensating for antenna load mismatch and, more specifically, to using Digital Signal Processing (DSP) to detect, measure, and ameliorate antenna load mismatch.

2. Description of the Related Art

In radio transmitters typically used in mobile and/or portable devices, such as, e.g., mobile phones, a power amplifier (source) is connected to an antenna (load), with the amplifier designed to perform best with a nominal load impedance of (50+j0) Ω. However, in real-case scenarios, the antenna is exposed to conditions which strongly perturb its radiated electromagnetic field (typically caused by the proximity of some object), which therefore makes its actual impedance significantly diverge from the nominal value.

In order to maximize the power transfer from a source to a load in an electrical circuit, the load impedance has to equal the complex conjugate of the source impedance: when this condition is not met, the power transferred to the load is sub-optimal, therefore resulting in antenna mismatch power loss.

Due to the intrinsic limitations in both the voltage and current swing of the amplifier (caused by other than power loss), antenna load mismatch may also cause distortion of the transmitted signal. Distortion, often measured in terms of Error Vector Magnitude (EVM), causes a reduction of the Signal-to-Noise Ratio (SNR) at the receiver end, which, if severe enough, may make the received signal not intelligible anymore, eventually causing the link to fall.

The traditional approach to deal with antenna mismatch is to insert an isolator between the power amplifier and the antenna. The main objective of the isolator is to avoid the power reflected from the mismatched load to enter back into the amplifier, potentially causing it to break. Apart from the obvious increase in the cost of the application, this solution also has as a drawback a reduction of the radiated output power which equals the insertion loss of the isolator.

A more elaborate approach to overcome antenna mismatch is to insert a tunable matching network between the power amplifier and the antenna. While this is the most elegant and robust solution to maximize the output power in case of antenna load mismatch, the tunable discrete components needed to realize such a tuning network tend to be bulky, expensive, and result in non-negligible insertion losses, even when exercising a perfectly matched load.

A number of analog adaptive techniques have been developed throughout the years to automatically adjust transmit gain, typically based on power or voltage detected to go onto the load, but those require dedicated analog circuitry and typically do not allow for a programmable EVM target.

Thus, there is a need to avoid the mismatch power loss without a dedicated matching network, i.e., a need for a mechanism to detect load mismatch would allow the transmitter to reduce the amount of distortion by backing-off the transmitted signal level, in a way that EVM is kept under control, so that the receiver can compensate with higher gain to the power loss, therefore allowing the link to stay alive.

SUMMARY OF THE INVENTION

Accordingly, the present invention is designed to address at least the problems and/or disadvantages described above and to provide at least the advantages described below. In one aspect of the present invention, Digital Signal Processing (DSP) techniques are used to evaluate the possible impact of antenna mismatch, while avoiding the use of external components. In another aspect of the present invention, a back-off policy for keeping constant EVM in case of antenna mismatch is implemented on a mobile transmitter.

According to one aspect of the present invention, an apparatus for at least one of detecting, measuring, and compensating for, antenna mismatch, includes: a transmit path of one or more components, including a Digital-to-Analog Converter (DAC) having a digital input and an antenna for transmitting a signal; a loopback path of one or more components, including a variable amplifier and a Analog-to-Digital Converter (ADC) having a digital output; and a processor configured to receive the digital input and the digital output, and to determine, based on the received digital input and output, a transmit transfer function when a test sweep signal is provided as the digital input.

According to another aspect of the present invention, a method for at least one of detecting, measuring, and compensating for, antenna mismatch, includes: providing a test sweep signal as digital input to a Digital-to-Analog Converter (DAC) in a transmit path which ends with an antenna configured to transmit a signal; determining a transmit transfer function based on the digital input signal and a digital output signal, the digital output signal being output from an Analog-to-Digital Converter (ADC) receiving output from a variable amplifier, wherein a loopback path electrically connected in parallel with a load impedance of the antenna comprises the ADC and the variable amplifier; and performing at least one of detecting, measuring, and compensating for, antenna mismatch using the determined transmit transfer function.

According to yet another aspect of the present invention, an apparatus for at least one of detecting, measuring, and compensating for, antenna mismatch, includes: a digital-to-analog converter (DAC), comprising an electrical input configured to receive a digital input and an electrical output configured to output an analog signal from the received input analog signal; a transmission variable amplifier comprising an electrical input configured to receive the analog signal from the DAC and an electrical output configured to output a variably-amplified transmission signal from the input analog signal received from the DAC; an antenna comprising an electrical input configured to receive the variably-amplified transmission signal, the antenna configured to transmit the received variably-amplified transmission signal; a loopback path electrically connected in parallel with a load impedance of the antenna comprising: a load-balancing variable amplifier comprising an electrical input configured to receive the variably-amplified transmission signal and an electrical output configured to output a variably-amplified test signal from the input variably-amplified transmission signal; an analog-to-digital converter (ADC) connected to the load-balancing variable amplifier comprising: an electrical input configured to receive the output variably-amplified test signal; and an electrical output configured to output a digital output from the variably-amplified test signal; and a processor configured to receive and process the digital input to the DAC and the digital output from the ADC, and to determine a transmit transfer function based on the digital input and output. The apparatus may comprise a portable device.

According to still another aspect of the present invention, instructions stored on at least one non-transitory computer-readable medium are configured to have one or more processors perform a method for at least one of detecting, measuring, and compensating for, antenna mismatch, the method including: providing a test sweep signal as digital input to a Digital-to-Analog Converter (DAC) in a transmit path which ends with an antenna configured to transmit a signal; determining a transmit transfer function based on the digital input signal and a digital output signal, the digital output signal being output from an Analog-to-Digital Converter (ADC) receiving output from a variable amplifier, wherein a loopback path electrically connected in parallel with a load impedance of the antenna comprises the ADC and the variable amplifier; and performing at least one of detecting, measuring, and compensating for, antenna mismatch using the determined transmit transfer function. A system may comprise the at least one non-transitory computer-readable medium.

BRIEF DESCRIPTION OF THE DRAWINGS

The above and other aspects, features, and advantages of embodiments of the present invention will be more apparent from the following detailed description taken in conjunction with the accompanying drawings, in which:

FIG. 7A shows an architecture for detecting, measuring, and/or compensating for antenna mismatch according to another embodiment of the present invention;

FIG. 7B shows an AM_IN vs. AM_OUT characteristic curve according to the embodiment of the present invention shown in FIG. 7A;

FIGS. 8A and 8B are graphs of the amplitude and phase, respectively, of the inverse function $f_{inv\text{-}trnsfr}$ stored in a LUT for PD 705 of FIG. 7A for different values of load mismatch gamma, in accordance with embodiments of the present invention.

DETAILED DESCRIPTION OF EMBODIMENTS OF THE INVENTION

One or more embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

According to embodiments of the present invention, antenna mismatch is detected, measured, and/or compensated for, using only DSP techniques, allowing for predictably-bounded and programmable transmitted EVM, and avoiding the use of external components such as isolators and tunable inductors/capacitors.

Embodiments of the present invention make use of a loop-back path which senses the voltage exercised into the load while transmitting an amplitude-varying known signal (which can be either a modulated packet, a wide-band random noise or a continuous wave tone), allowing the non-linearity of the transmit path to be characterized. Digital Signal Processing techniques are applied to both the transmitted and fed-back signals, to evaluate the transfer function of the transmit chain, and from that to extract the Compression-Point (CPx), meaning the amplitude of the input signal for which the gain is reduced x dB compared to the small-signal value.

As discussed further below, variations in the CPx of the transmit chain have been empirically shown to be linearly correlated to EVM, making it possible to define a target position for CPx, which will provide the desired EVM. Thus, according to embodiments of the present invention, transmit gain can be fine-adjusted until a desired CPx target position is met.

Figure 1A:
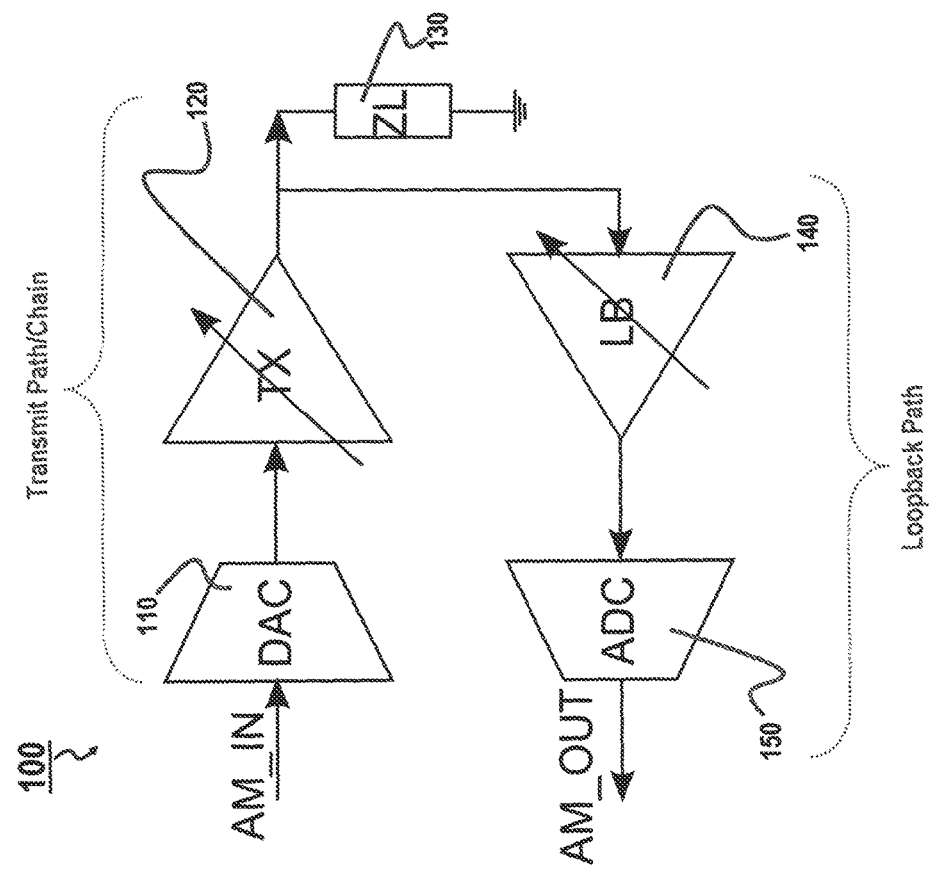
FIG. 1A shows an architecture for detecting, measuring, and/or compensating for antenna mismatch according to an embodiment of the present invention.

FIG. 1A depicts a transmitter architecture 100 which can detect, measure, and/or compensate for antenna mismatch according to one embodiment of the present invention. As shown in FIG. 1A, digital signal AM_IN is input into Digital-to-Analog Converter (DAC) 110, which, in turn, outputs an analog signal to transmitter amplifier (TX) 120 which amplifies the signal for transmission by one or more antennas, which is not shown. Instead, impedance ZL 130 is shown, which represents the load impedance of the transmit chain: typically the cascade of elements of the signal path from the chip to the antenna, including matching components, switches and filters. Thus, DAC 110 and TX 120 make up the pertinent parts of the transmit path in the chip of transmitter 100—which, as would be known to one of ordinary skill in the art, may include many more components depending on the particular implementation. For example, a typical transmit path would include mixers to/from the carrier frequency.

In FIG. 1A, loopback variable amplifier (LB) 140 and Analog-to-Digital Converter (ADC) 150 form the loopback path according to an embodiment of the present invention. Such a loopback path can detect with sufficient accuracy at least the amplitude of the voltage on the load. The loopback can be either a dedicated loopback path (typically including a down-mixer), or use an available receiver/reception (RX) path/chain in a transceiver embodiment, or even a simpler dedicated envelope demodulator. Although depicted as a variable amplifiers in FIG. 1A, LB 140 could comprise a number of components, including, but not limited to, transformers, directional couplers, down-conversion mixers, rectifiers, Voltage-to-Current and/or Current-to-Voltage converters, filters, etc. The loopback path provides the digital signal AM_OUT which, with AM_IN, is used to detect, measure, and compensate for, antenna mismatch according to embodiments of the present invention.

Figure 1B:
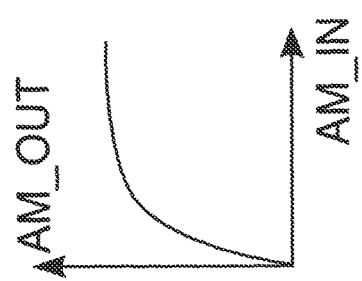
FIG. 1B shows an AM_IN vs. AM_OUT characteristic curve according to an embodiment of the present invention.

FIG. 1A shows a generalized architecture in order to demonstrate how the present invention works for any transmitter/transceiver, and any given transmit gain and load impedance. Specifically, by monitoring AM_OUT and AM_IN (or, more specifically, the AM_IN vs. AM_OUT characteristic, as shown in FIG. 1B) according to the method discussed below, embodiments of the present invention can detect, measure, and/or compensate for, antenna mismatch using DSP with minimal and/or not additional components. FIG. 1B shows the curve that occurs when there is sufficient gain in the transmit (TX) chain to start distorting the signal.

However, for embodiments of the present invention to work properly, the transmit path must have a programmable gain: the finer the transmit gain step, the higher will be the EVM-compliant achievable power. In this embodiment, the transmit gain is controlled in the digital domain (which typically allows for finer and more repeatable gain steps over different conditions), although other embodiments could control transmit gain in either the analog or the digital domain. In addition, for embodiments of the present invention to work properly, the loopback path gain should be more linear than the transmit path gain, and can be adjusted so that saturation is never reached. Loopback gain would typically be controlled in the analog domain, to allow for the necessary range/sensitivity while relaxing ADC specifications. However, other embodiments could control loopback gain in either the analog or the digital domain. Lastly, for embodiments of the present invention to work properly, the dynamic range of the loopback path must be greater than the dynamic range of the output transmit path.

Figure 1C:
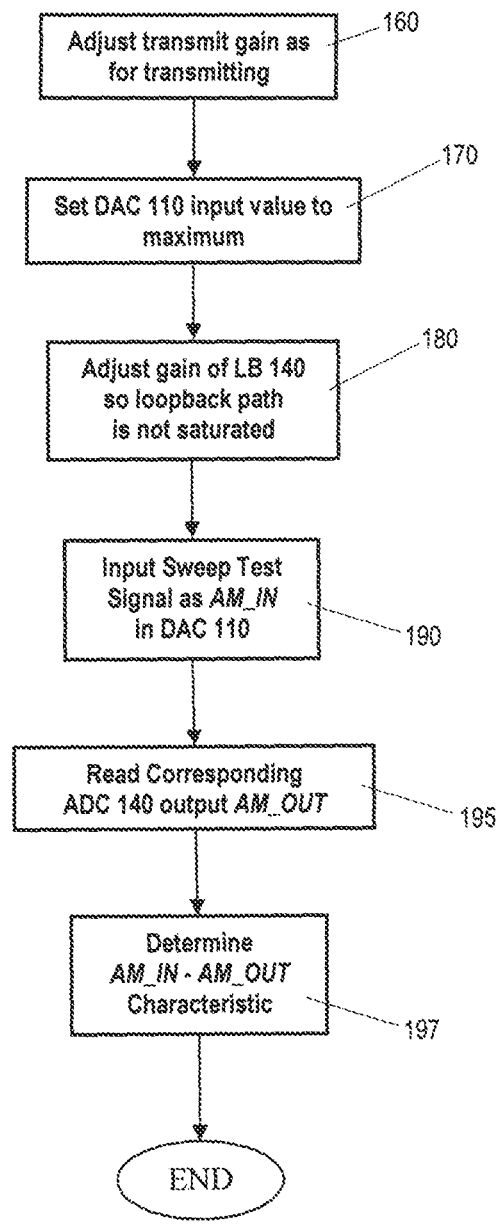
FIG. 1C is a flowchart of a method for determining the AM_IN vs. AM_OUT characteristic curve using a loopback path architecture like that shown in FIG. 1A, according to an embodiment of the present invention.

For any given transmit gain and load impedance, embodiments of the present invention can ascertain the AM_IN vs. AM_OUT characteristic following the method shown in FIG. 1C.

In step 160 of FIG. 1C, the transmit gain is adjusted as for transmitting, i.e., the analog and digital gains have to be configured in the same way as expected to be used when performing modulated transmission. If different settings are used for different modulations, the same procedure can be iterated for each modulation. In step 170, DAC 110 input value (digital code) is set to maximum. Alternatively, if a continuous-wave (CW) tone or modulated signal is used, the input signal should be scaled to exploit the whole dynamic range of the DAC. In step 180, the gain of LB 140 is continually adjusted so that the loopback path is not saturated. The loopback path is set once such that none of the blocks composing the LB path/chain is saturated. Since in step 170, the digital code (or alternatively, the digital amplitude scaled signal, in case of a CW tone or modulated signal) input to DAC 110 was set to its maximum level, step 180 guarantees that there will not be saturation for any other DAC 110 input level.

In step 190, sweep test signal AM_IN is input into DAC 110. Sweep test signal AM_IN "sweeps" through all possible input digital codes (or alternatively, all possible digital amplitude scaled values, in case of a CW tone or modulated signal), i.e., if the DAC 110 input was three bits, from 000 to 111. In other embodiments, different sweep/search algorithms (i.e., dichotomic sweep/search algorithms) can be used to fasten the measurement or improve accuracy around the "Compression Point." In step 195, the ADC output values (AM_OUT) corresponding to sweep test signal AM_IN input to DAC 110 are read, thereby allowing the AM_IN vs. AM_OUT characteristic to be determined.

As mentioned above, a sinusoidal tone may be the sweep test signal AM_IN input into DAC 110 in step 190 in accordance with other embodiments, thereby sweeping the amplitude from peak-to-peak. More complex waveforms (e.g., random noise or OFDM) for the level sweep test signal is also possible, but special care should be used in those cases in averaging, for a sufficiently long time constant (either by analog low-pass filtering or by digital signal processing), the signal AM_OUT read from ADC 150.

Figure 2A:
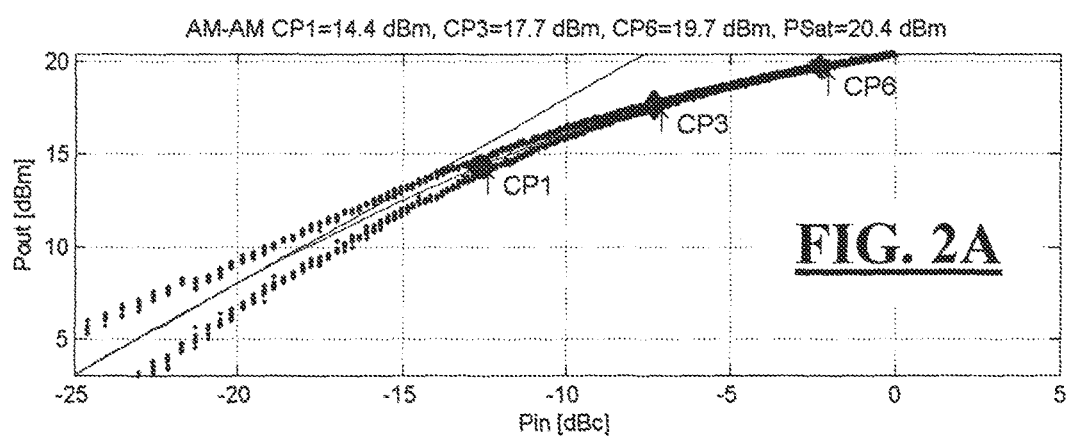
FIG. 2A is a graph of examples of AM_IN/AM_OUT characteristic curves, showing the so-called "compression points" CP1, CP3 and CP6, meaning the amplitudes for which the characteristic curve deviates from the linear gain characteristic (black straight line) of 1, 3 and 6 dB respectively.
Figure 2B:
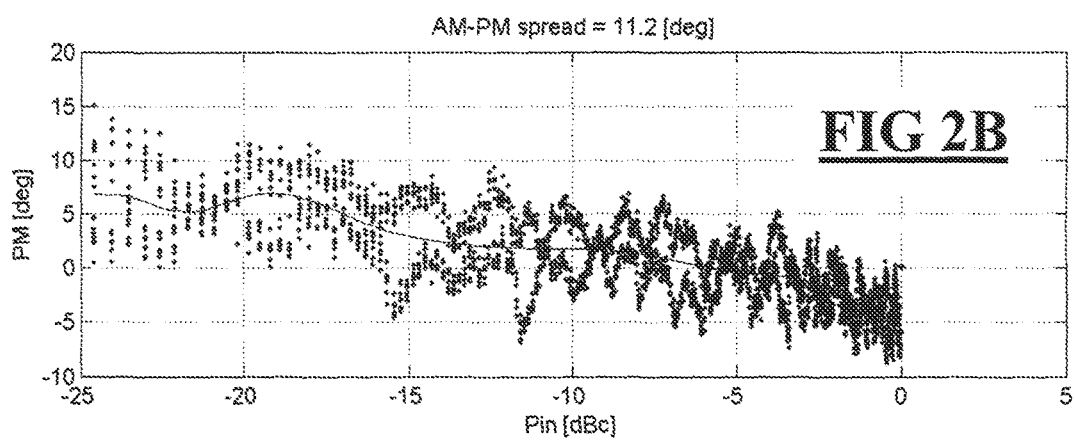
FIG. 2B is a graph of the output phase as a function of the input amplitude (AM-PM)

Examples of AM_IN/AM_OUT characteristic curves are shown in FIG. 2A, which also shows the so-called "compression points" CP1, CP3 and CP6, meaning the amplitudes for which the AM-AM curve (Amplitude in-Amplitude out) deviates from the linear gain characteristic (the straight line) of 1, 3 and 6 dB respectively. Usually CP1 is considered the amplitude up to which the transmit function can be considered linear. Similarly, as shown in FIG. 2B, the output phase represented as a function of the input amplitude (i.e., AM-PM) undergoes a distortion.

As the input signal level (AM_IN or $P_{in}$) increases in the TX, the distortion starts to become visible in the AM-AM curve, and the EVM contributions due to the TX non-linearity increase above the EVM floor due to other contributors (that in general are not that signal-level dependent). Under the assumption that the transmit EVM is dominated by the non-linearity of the transmit chain, the average EVM can be estimated by knowing: (1) the distortion of the chain, meaning the deviation of the AM_OUT vs AM_IN curve from the linear characteristic; and (2) the statistical distribution of the input signal.

Figure 3A:
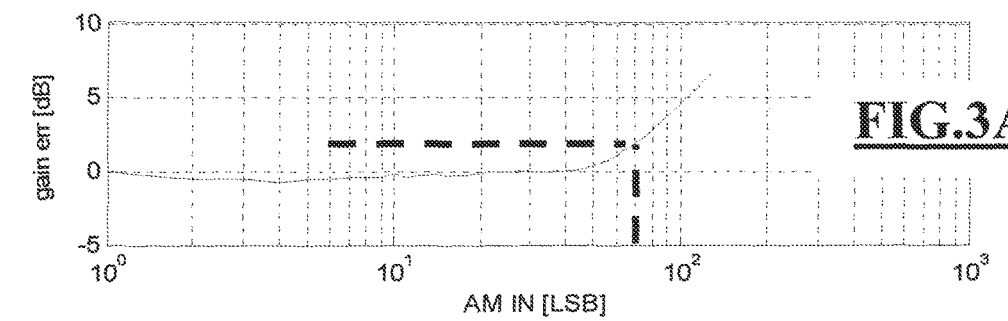
FIG. 3 provides graphs which show that, by knowing the AM-AM (FIG. 3A), possibly the AM-PM (FIG. 3B), and the Probability Distribution Function (PDF) of the signal to be transmitted (FIG. 3C), one can calculate the cumulated EVM up to the given AM_IN amplitude, as shown in FIG. 3D, according to embodiments of the present invention.
Figure 3B:
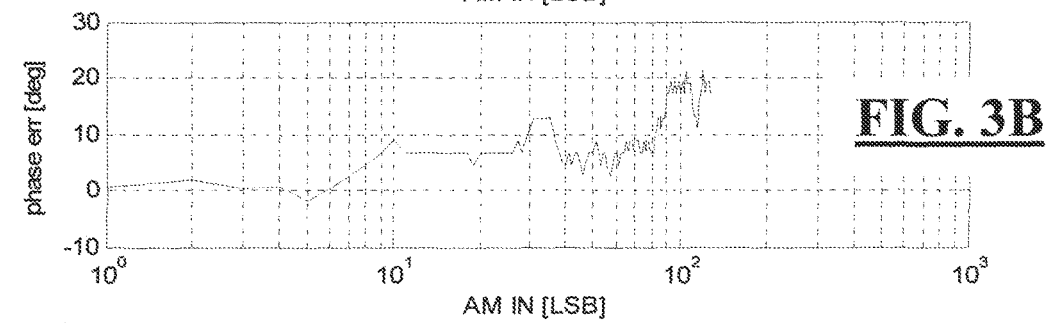
Figure 3C:
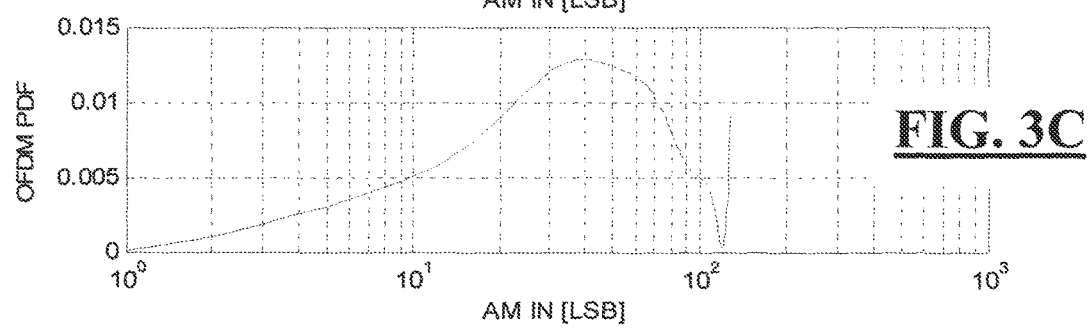
Figure 3D:
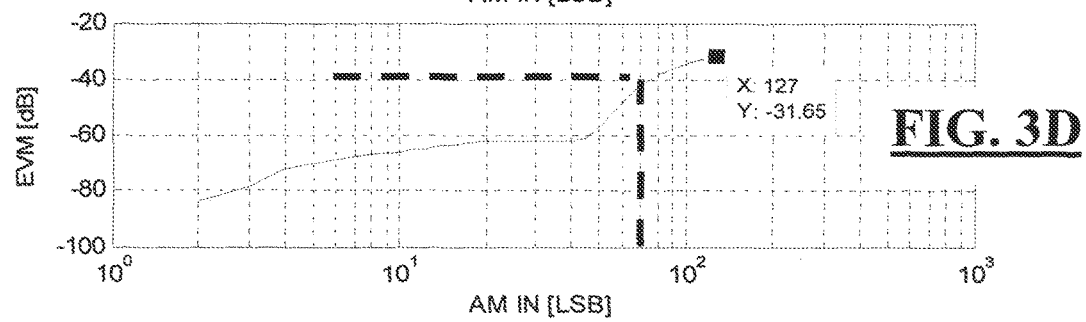

Continuing under the assumptions above, the graphs in FIG. 3 further indicate that by knowing the AM-AM (FIG. 3A), and possibly the AM-PM (Amplitude in-Phase out) too (FIG. 3B), and the Probability Distribution Function (PDF) of the signal to be transmitted (FIG. 3C), one can calculate the cumulated EVM up to the given AM_IN amplitude, expressed as the Least Significant Bits (LSBs) of the AM_IN input to DAC 110, as shown in the bottom plot (FIG. 3D).

Assuming the back-off power will not increase the contribution of the other EVM sources (i.e., the noise floor is low enough, etc.), the back-off needed to meet a given EVM target can be determined just based on this measurement. For instance, taking for example FIG. 3, one can evaluate the back-off needed to meet the target EVM=−40 dB as:

$$bo_{dB} = 20 \cdot \log_{10}\left(\frac{127}{70}\right) \quad (1)$$

It should be noted that the overall EVM will include other contributors that will increase the estimated value determined by this method.

In many cases, the impact of the AM-AM distortion is more relevant than the AM-PM, and in such cases, one should first concentrate in looking just at the gain error contribution.

As a further extension, one may just want to be sure that the whole range is (almost) linear, for instance by imposing that CP1 (or any other arbitrary CPx) is never reached, or is found above a given position. The position, and the grade "x" of the CP better to observe, would be determined by the PA compression characteristic. Of course, if just the position of a desired CPx is needed, other more targeted search algorithms (such as, e.g., bisection or Newton-Raphson) can be used instead of a full DAC sweep, in order to save power and time.

Experiments performed with a fixed transmit gain on a varying load impedance have shown an average linear dependency between the position of the compression point and the resulting EVM.

Figure 4:
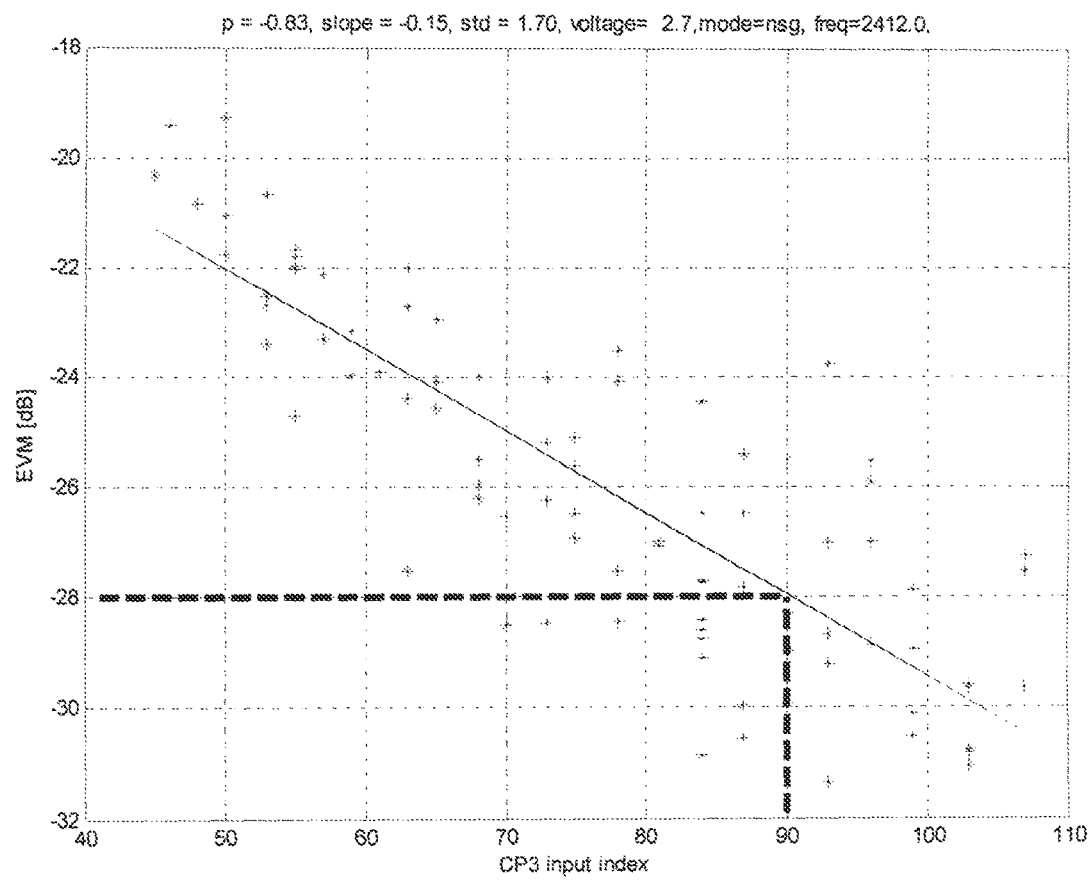
FIG. 4 is a graph of the results from an experiment performed with a fixed transmit gain on a varying load impedance, which shows an average linear dependency between the position of the compression point and the resulting EVM, in accordance with embodiments of the present invention.

FIG. 4 shows an example, where the position of CP3 is expressed in DAC LSBs scale. In one practical case, the measurement of the Pearson's correlation coefficient (p=0.83) shows that there is a strong correlation between EVM and CP3 position. Based on such a characterization and on the desired EVM target, we can define a target position for the CPx, so that the average EVM will be met. Continuing with the example of FIG. 4, 90 would be the target CP3 index chosen to provide −28 dB of EVM, with an expected standard deviation equal to the standard deviation of the real measurements around the straight line average: std=1.7 dB.

Moreover, the linear relationship between the EVM and the Compression Point(s) was observed to be true (within some variable degree of accuracy) in real cases when the non-linearity of the transmit chain dominates the EVM contribution (FIG. 4 is a real-life example).

Whenever the measured position of the compression point is not met, the deviation of EVM from the desired value can be estimated by multiplying the difference of the measured CPx and the target with the slope of the characterized EVM vs. the CPx:

$$\Delta EVM_{est} = (CP_X - CP_{target}) \cdot slope \quad (2)$$

Figure 5A:
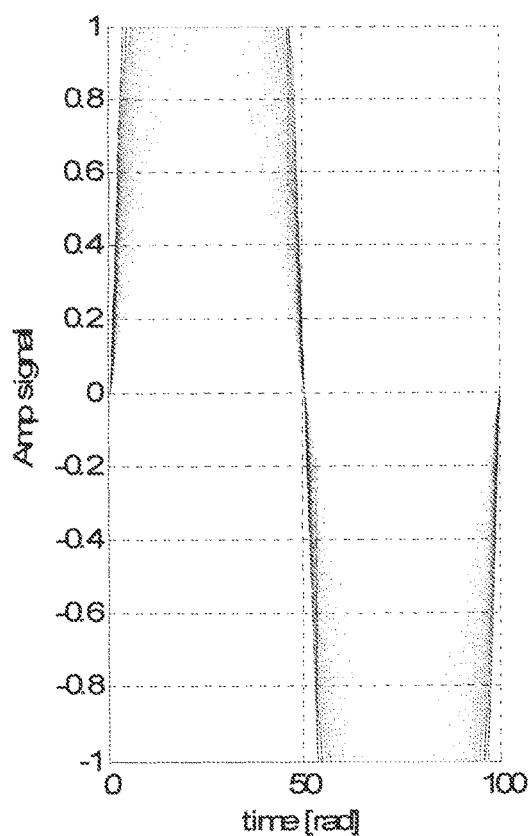
FIGS. 5A and 5B are graphs showing the effects of hard saturation.
Figure 5B:
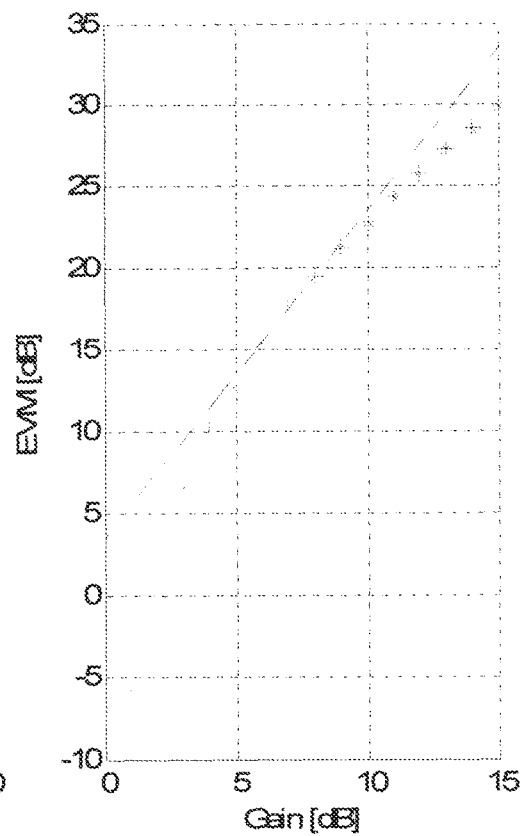
Figure 6:
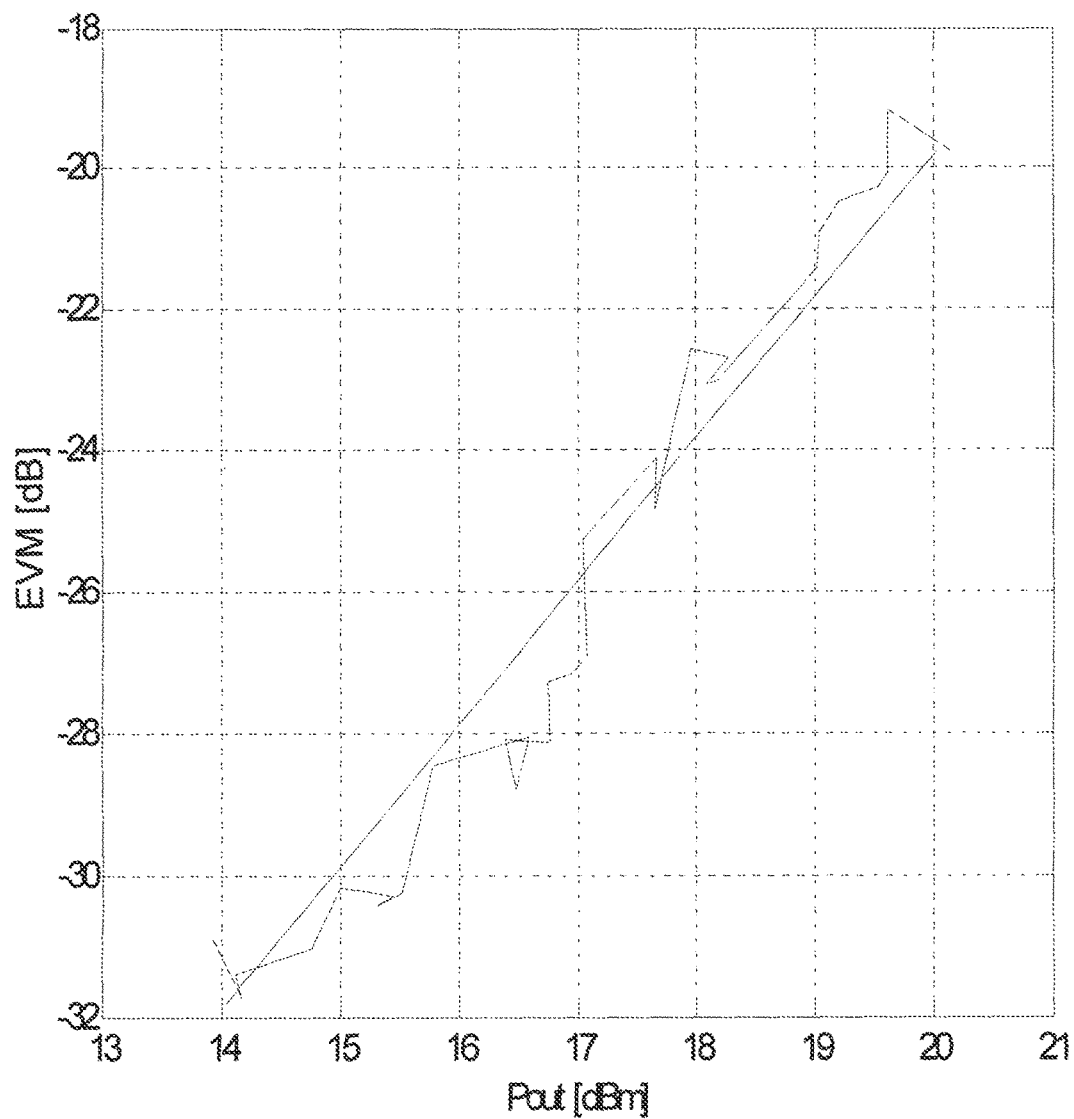
FIG. 6 is a graph of the measured EVM vs. increasing output power on an actual transmitter.

When the EVM is just due to hard-clipping of the transmitted signal, the EVM increases 2 dB for every dB the transmit gain increases—in other words, the EVM vs. transmit gain curve is linear in the dB-scale with a slope of 2. This is shown analytically in FIGS. 5A and 5B, and experimentally in the $P_{out}$ vs EVM plot of FIG. 6, obtained by sweeping the gain of a WiFi transmitter with a 64-QAM-OFDM modulated signal. FIG. 5A is a graph showing a sinusoid caused by the application of a progressive gain increase, i.e., demonstrating the effect of hard saturation. In FIG. 5B, the EVM due to the distortion caused by the hard saturation of the sinusoid of FIG. 5A is plotted against the corresponding gain. The tangent line in FIG. 5B shows that in a range of a few dBs EVM vs. gain has about 2 dB/1 dB slope.

Based on the above, the decrease (or even increase) of power (or back-off bo) that should be applied to meet a target EVM can be estimated using:

$$bo = \frac{\Delta EVM_{est}}{2} = (CP_X - CP_{target}) \cdot \frac{slope}{2} \quad (3)$$

In case of negative backoff coefficient, the CP point is in the "safe side" of the AM-AM curve, meaning the expected EVM will have some margin compared to the target. In that case, if no other constraints besides the EVM need to be taken into account (i.e., mask compliancy), backoff can be considered as a gain increase that can safely be applied to (at least partially) recover for mismatch loss. If the backoff coefficient resulting from the previous formula is negative, the expected EVM will be lower than the target. In that case, and again assuming no other constraints besides the EVM need to be taken into account, instead of reducing (back-off), power can safely be increased to at least partially recover for mismatch loss.

With this foundation in place, a pseudo-code example of implementing the method of FIG. 1C is presented below. In the pseudo-code example, (1) an EVM vs Compression Point linear relationship with slope=evm_per_cp3 is assumed; (2) cp3_target guarantees the target EVM, as empirically characterized (like FIG. 4); and (3) a 2 dB EVM/1 dB Gain relationship holds, like FIGS. 5-6. Returning to FIG. 1C for comparison with the example pseudo-code, set_tx_gain (default_tx_gain) corresponds to step 160, set_loopback_gain ( ) corresponds to step 180, and cp_search (3) corresponds to steps 170, 190, 195, and 197.

Pseudo-Code:

```
evm_per_cp3 = 0.15 ;
cp3_target   = 90;
set_tx_gain(default_tx_gain);
set_loopback_gain( );
transmit_cw_tone( );
    cp3      = cp_search(3);
    cpdelta  = cp3_target − cp3;
    evmdelta = evm_per_cp3 * cpdelta;
    backoff  = evmdelta / 2;      % 2dB_evm/1dB_Pout
set_tx_gain(default_tx_gain − backoff);
```

FIG. 7A depicts a transmitter architecture 700 which can detect, measure, and/or compensate for antenna mismatch, and also has a pre-distorter mechanism (PD) 705, according to another embodiment of the present invention. FIG. 7A has a transmit path, similar to FIG. 1A, comprising Digital-to-Analog Converter (DAC) 710, which outputs an analog signal to transmitter amplifier (TX) 720 which, in turn, amplifies the signal for transmission. Impedance ZL 730 represents the load impedance of the transmit chain: typically the cascade of elements of the signal path from the chip to the antenna, including matching components, switches and filters. Also similar to FIG. 1A, FIG. 7A has a loopback path with a loopback variable amplifier (LB) 740 and Analog-to-Digital Converter (ADC) 750 form the loopback path according to this embodiment of the present invention. The loopback path provides the digital signal AM_OUT which, with AM_IN, is used to detect, measure, and compensate for, antenna mismatch according to embodiments of the present invention.

However, as stated above, unlike FIG. 1A, the transmitter architecture 700 in FIG. 7A has pre-distorter (PD) 705, which is a DSP block that outputs the digital AM_IN signal to the transmit path and receives the AM_OUT digital signal from the loopback path. As shown by the AM_IN/AM_OUT graph of FIG. 7B, PD 705 would derive the transfer-function of the transmit chain (i.e., curve $f_{transfer}$ in FIG. 7B), and compute its inverse function ($f_{inv-trnsfr}$ in FIG. 7B), which will be applied to the transmitted signal to compensate for the non-linearities of the transmit chain. In one embodiment, the transmit inverse function $f_{inv-trnsfr}$ is stored in a Look-Up Table (LUT), although it may also be calculated and/or otherwise determined/estimated in other embodiments. The horizontal dot-dash line in FIG. 7B shows the saturation of the inverse function $f_{inv-trnsfr}$ as represented in a digital domain (and, thus, by definition, upper-bounded).

In an embodiment using a LUT, the LUT would most likely contain the same kind of information regarding the Compression-Points, even though a constant scaling factor may possibly have to be applied.

FIGS. 8A and 8B illustrate example shapes for varying values of load impedance of different PD LUTs. Specifically, FIGS. 8A and 8B represent the amplitude and phase, respectively, of the $f_{inv\text{-}trnsfr}$ stored in the PD LUT for different values of load mismatch gamma.

The CPx point can be extracted from the PD-LUT as the index of the first point which exceeds the value:

$$LUT(x) = LUT(0) \cdot 10^{\frac{x}{20}} \qquad (4)$$

Figure 9:
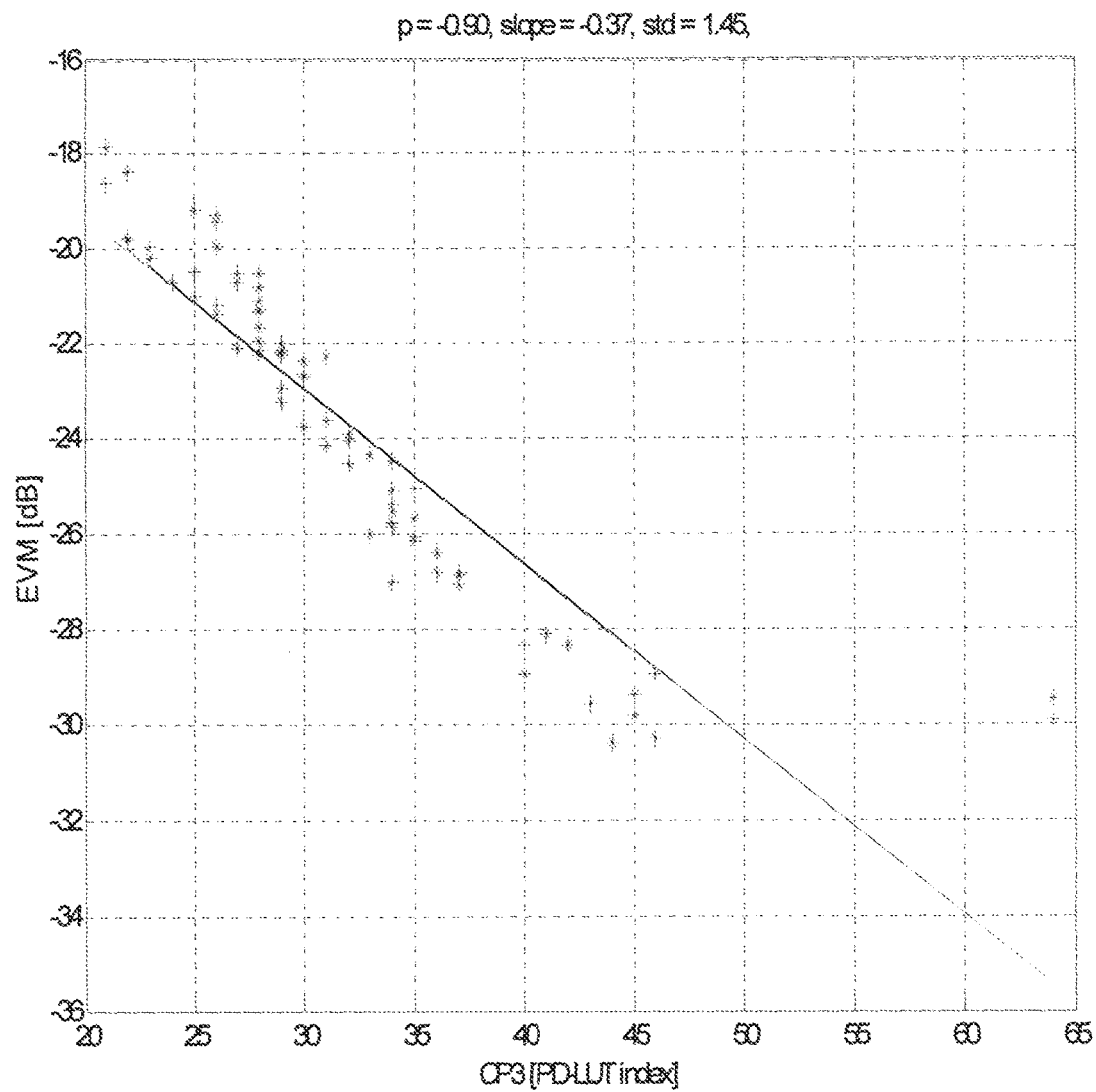
FIG. 9 is a graph of CP3[PD-LUT index] vs. EVM[dB] based on experimental observations, which indicate that the PD implementation in FIG. 7A has the same CPx vs. EVM linear characteristic as observed for the implementation in FIG. 1A.

Experimental observations, shown in FIG. 9, indicate that the PD implementation in FIG. 7A has the same CPx vs. EVM linear characteristic as observed for the implementation in FIG. 1A. The backoff coefficient can therefore be evaluated in exactly the same way as in the standard case.

In the PD implementation, reducing the gain in the transmit path would not have much effect, because the PD block would typically increase the gain in the LUT to try to compensate for the gain loss. Hence, the correct way to apply back-off for a PD architecture is to increase the gain in the loopback path which will have the effect of artificially increasing the AM_OUT signal fed-back into the PD block, so that it will reduce the transmit gain in the LUT in order to compensate for the gain increase. In this embodiment of the present invention, the assumption is that the DSP block continues to update the LUT with new coefficients depending on the current AM_IN/AM_OUT relationship, therefore resulting in different coefficients depending on the load impedance as shown in FIGS. 8A/8B. In this context, the DSP block acts on the LUT entries, in the attempt to keep the LUT+TX+LB loop gain constant. With LB gain being constant, a variation of the TX gain will be compensated by an opposite update in the LUT coefficients, resulting in a constant output power. Conversely, a variation of gain in the LB will be compensated by the LUT, with TX gain staying constant, therefore resulting in an inverse variation of the output power. That is why in this embodiment it is ineffective to modify the TX gain, and in order to perform a power control, LB gain is changed instead.

For the PD implementation of the invention to work properly, the gain steps in the loopback path have to be fine and repeatable: the finer the gain steps, the higher the maximum achievable power for an EVM-compliant signal.

Using an artificial load (i.e., a zener diode) in parallel to the matched impedance to clip the signal on the load to a desired level would strongly impact the CP without affecting the actual load impedance. By applying different clipping levels, it will be possible to trace the "clip voltage" vs. $P_{out}$ characteristic: a device which implements this embodiment of the present invention would show a linearly varying "clip voltage" vs. $P_{out}$ characteristic, whereas a device which either does not implement any load impedance control/estimation (such as, e.g., Voltage Standing Wave Ratio control) would show a constant characteristic.

As shown by the various embodiments discussed above, advantages of the present invention include, but are not limited to:

No external components required.
No dedicated analog circuitry required (can use radio receive path as feedback).
Can be used to compensate for other factors which influence linearity of the transmit chain such as temperature and process corner.
Can be used also to partially recover for mismatch loss.
Easily programmable EVM target.

Depending on the embodiment of the present invention, some or all of the steps and/or operations may be implemented or otherwise performed, at least in part, using one or more processors running instruction(s), program(s), interactive data structure(s), client and/or server components, where such instruction(s), program(s), interactive data structure(s), client and/or server components are stored in one or more non-transitory computer-readable media. The one or more non-transitory computer-readable media may be instantiated in software, firmware, hardware, and/or any combination thereof.

The one or more non-transitory computer-readable media and/or means for implementing/performing one or more operations/steps of an embodiment of the present invention may include, without limitation, application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of any system components and/or data structures may also be stored as contents (e.g., as executable or other non-transitory machine-readable software instructions or structured data) on a non-transitory computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of any system components and data structures may also be stored as data signals (e.g., by being encoded as part of a carrier wave or included as part of an analog or digital propagated signal) on a variety of non-transitory computer-readable transmission mediums, from which they are read and then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced any computer system configuration.

Thus, the term "non-transitory computer-readable medium" as used herein refers to any medium that comprises the actual performance of an operation (such as hardware circuits), that comprises programs and/or higher-level instructions to be provided to one or more processors for performance/implementation (such as instructions stored in a non-transitory memory), and/or that comprises machine-level instructions stored in, e.g., firmware or non-volatile memory. Non-transitory computer-readable media may take many forms, such as non-volatile and volatile media, including but not limited to, a floppy disk, flexible disk, hard disk, RAM, PROM, EPROM, FLASH-EPROM, EEPROM, any memory chip or cartridge, any magnetic tape, or any other magnetic medium from which a computer instruction can be read; a CD-ROM, DVD, or any other optical medium from which a computer instruction can be read; punch cards, paper tape, any other physical medium with one or more patterns of holes, or any other non-transitory medium from which a computer instruction can be read.

As mentioned above, some or all of the steps and/or operations of embodiments of the present invention may be implemented or otherwise performed, at least in part, by one or more processors. A "processor" as used herein refers to any device configured to perform one or more operations based on instructions, including, but not limited to, any general purpose processor in communication with a storage medium from which computer-readable instructions can be retrieved, a special-purpose processor configured to execute specific types of instructions (such as a Digital Signal Processor or DSP), a special-purpose processor where some or all of the instructions are hard-wired into the actual processor design, any combination thereof, and/or any other type of processor. A processor as used herein may take any form, from a simple micro-controller to a completely self-contained computing system having a bus, memory controller, cache, etc., to a group or cluster of computing devices networked together to provide greater processing capability (e.g., distributed computing). A processor as used herein may have one or more cores, and a multi-core processor used to implement an embodiment of the present invention may be symmetric or asymmetric.

Accordingly, embodiments of the present invention may be implemented in a wide variety of computing architectures and environments, as would be understood by one of ordinary skill in the art. One or more logical operations of embodiments of the present invention may be implemented as: (1) a sequence of computer implemented steps, operations, or procedures running on one or more general use programmable circuits, (2) a sequence of computer implemented steps, operations, or procedures running on one or more specific-use programmable circuits; and/or (3) interconnected machine modules or program engines within one or more general use and/or specific-use programmable circuits. One or more processors used to perform one or more steps and/or operations in accordance with embodiments of the present invention may also perform other functions, steps, and operations neither considered nor discussed herein (e.g., the one or more processors being multi-functional and/or capable of multi-tasking).

Depending on the embodiment of the present invention, some or all of the steps and/or operations may be implemented or otherwise performed, at least in part, on a portable device. "Portable device" as used herein refers to any mobile or otherwise portable electronic device having the capability of receiving signals via one or more antennae, including, but not limited to, multimedia players, communication devices, computing devices, navigating devices, etc. Thus, mobile devices include (but are not limited to) laptops, tablet computers, Portable Digital Assistants (PDAs), mp3 players, handheld PCs, Instant Messaging Devices (IMD), cellular telephones, Global Navigational Satellite System (GNSS) receivers, watches, or any such device which can be worn and/or carried on one's person.

While several embodiments of the present invention have been shown and described herein, it will be understood by those of ordinary skill in the art that various changes in form and details may be made therein without departing from the spirit and scope of the present invention—i.e., the invention is not limited to and/or by any embodiments described herein, but is defined by the appended claims and their equivalents.

What is claimed is:

1. An apparatus which compensates for antenna mismatch, comprising:
    a transmit path comprising one or more components, including a Digital-to-Analog Converter (DAC) having a digital input, an antenna for transmitting a signal, and a transmitter amplifier for amplifying the signal before transmission via the antenna;
    a loopback path comprising one or more components, including a variable amplifier and a Analog-to-Digital Converter (ADC) having a digital output; and
    a processor configured to:
        receive the digital input and the digital output;
        determine, based on the received digital input and output, a transmit transfer function when a test sweep signal is provided as the digital input;
        determine, based on the determined transmit transfer function, a change in transmission power to compensate for antenna mismatch; and
        control the transmitter amplifier to compensate for antenna mismatch by amplifying the signal to be transmitted by the antenna in accordance with the determined change in transmission power,
    wherein the processor determines the change in transmission power:
        by determining a back-off power change needed to achieve a target Error Vector Magnitude (EVM) based on the determined transmit transfer function, a relationship between the EVM for an input power being identified based on the determined transfer function, the EVM increasing as the input power increasing, and the back-off power change being determined such that the EVM does not exceed the target EVM when the input power is maximum; or
        by looking up, in a pre-stored look-up table, a transmission power change corresponding to the determined transmit transfer function; or
        by determining, based on one or more compression points calculated based on the determined transfer function, the change in transmission power based on a difference between a target compression point and a measured compression point.

2. The apparatus of claim 1, wherein the test sweep signal comprises a signal which sweeps at least one of possible amplitude values, possible phase values, and possible digital input values.

3. The apparatus of claim 1, wherein the test sweep signal comprises at least one of a substantially sinusoidal signal, a substantially peak-to-peak amplitude signal, a substantially Continuous Wave (CW) tone signal, and a modulated signal.

4. The apparatus of claim 1, wherein the test sweep signal is based on a dichotomic algorithm configured to improve one or more transmission conditions.

5. The apparatus of claim 1, wherein the loopback path is electrically connected in parallel with a load impedance of the antenna.

6. The apparatus of claim 1, further comprising:
    a means for averaging the digital output over a sufficiently long time constant, wherein the processor receives the averaged digital output for determining the transmit transfer function.

7. The apparatus of claim 6, wherein the means for averaging comprises at least one of an analog low-pass filter, a digital filter, and a digital signal processor.

8. The apparatus of claim 1, wherein the processor comprises a pre-distortion digital signal processor (DSP) configured to provide the digital input to the DAC.

9. The apparatus of claim 8, wherein the pre-distortion DSP is further configured to compute an inverse function of the determined transmit transfer function.

10. The apparatus of claim 8, further comprising:
    a Look-Up Table (LUT) configured to store inverse functions of transmit transfer functions, wherein the pre-distortion DSP determines an inverse function of the determined transmit transfer function using the LUT.

11. The apparatus of claim 10, wherein the pre-distortion DSP determines the inverse function by applying a scaling factor to an inverse function corresponding to the determined transmit transfer function retrieved from the LUT.

12. The apparatus of claim 10, wherein the pre-distortion DSP updates inverse functions stored in the LUT.

13. A method of compensating for antenna mismatch, comprising:
providing a test sweep signal as digital input to a Digital-to-Analog Converter (DAC) in a transmit path which includes a transmitter amplifier and ends with an antenna configured to transmit a signal;
determining a transmit transfer function based on the digital input signal and a digital output signal, the digital output signal being output from an Analog-to-Digital Converter (ADC) receiving output from a variable amplifier, wherein a loopback path electrically connected in parallel with a load impedance of the antenna comprises the ADC and the variable amplifier;
determining, based on the determined transmit transfer function, a change in transmission power to compensate for antenna mismatch; and
compensating for antenna mismatch by controlling the transmitter amplifier to amplify the signal to be transmitted by the antenna in accordance with the determined change in transmission power,
wherein the change in transmission power is determined:
by determining a back-off power change needed to achieve a target Error Vector Magnitude (EVM) based on the determined transmit transfer function, a relationship between the EVM for an input power being identified based on the determined transfer function, the EVM increasing as the input power increasing, and the back-off power change being determined such that the EVM does not exceed the target EVM when the input power is maximum; or
by looking up, in a pre-stored look-up table, a transmission power change corresponding to the determined transmit transfer function; or
by determining, based on one or more compression points calculated based on the determined transfer function, the change in transmission power based on a difference between a target compression point and a measured compression point.

14. The method of claim 13, wherein the test sweep signal comprises a signal which sweeps at least one of substantially all possible amplitude values, substantially all possible phase values, and substantially all possible digital input values.

15. The method of claim 13, wherein the test sweep signal comprises at least one of a substantially sinusoidal signal, a substantially peak-to-peak amplitude signal, a substantially Continuous Wave (CW) tone signal, and a modulated signal.

16. The method of claim 13, wherein the test sweep signal is based on a dichotomic algorithm configured to improve one or more transmission conditions.

17. The method of claim 13, wherein determining comprises:
averaging the digital output signal over a sufficiently long time constant, wherein the averaged digital output is used to determine the transmit transfer function.

18. The method of claim 13, further comprising:
determining an inverse function of the determined transmit transfer function.

19. A portable device capable of compensating for antenna mismatch, comprising:
a digital-to-analog converter (DAC), comprising:
an electrical input configured to receive a digital input; and
an electrical output configured to output an analog signal from the received input analog signal;
a transmission variable amplifier, comprising:
an electrical input configured to receive the analog signal from the DAC; and
an electrical output configured to output a variably-amplified transmission signal from the input analog signal received from the DAC;
an antenna comprising an electrical input configured to receive the variably-amplified transmission signal, the antenna configured to transmit the received variably-amplified transmission signal;
a loopback path electrically connected in parallel with a load impedance of the antenna, the loopback path comprising:
a load-balancing variable amplifier comprising:
an electrical input configured to receive the variably-amplified transmission signal; and
an electrical output configured to output a variably-amplified test signal from the input variably-amplified transmission signal;
an analog-to-digital converter (ADC) connected to the load-balancing variable amplifier, comprising:
an electrical input configured to receive the output variably-amplified test signal; and
an electrical output configured to output a digital output from the variably-amplified test signal; and
a processor configured to:
receive and process the digital input to the DAC and the digital output from the ADC,
determine a transmit transfer function based on the digital input and output;
determine, based on the determined transmit transfer function, a change in transmission power to compensate for antenna mismatch; and
control the transmission variable amplifier to compensate for antenna mismatch by amplifying the signal to be transmitted by the antenna in accordance with the determined change in transmission power.

20. The portable device of claim 19, wherein the processor comprises a pre-distortion digital signal processor (DSP) configured to provide the digital input to the DAC and to determine an inverse function of the determined transmit transfer function.

21. The portable device of claim 20, further comprising:
a Look-Up Table (LUT) configured to store inverse functions of transmit transfer functions, wherein the pre-distortion DSP determines an inverse function of the determined transmit transfer function using the LUT.

22. The portable device of claim 19, further comprising:
an impedance load electrically connected in parallel to the loopback path and the load impedance of the antenna, the impedance load being configured for at least one of estimating and controlling the load impedance of the antenna.

23. The portable device of claim 19, wherein the processor determines the change in transmission power by:
determining a back-off power change needed to achieve a target Error Vector Magnitude (EVM) based on the determined transmit transfer function, a relationship between the EVM for an input power being identified based on the determined transfer function, the EVM increasing as the input power increasing, and the back-off power change being determined such that the EVM does not exceed the target EVM when the input power is maximum.

24. The portable device of claim 19, wherein the processor determines the change in transmission power by:
  looking up, in a pre-stored look-up table, a transmission power change corresponding to the determined transmit transfer function.

25. The portable device of claim 19, wherein the processor determines the change in transmission power by:
  determining, based on one or more compression points calculated based on the determined transfer function, the change in transmission power based on a difference between a target compression point and a measured compression point.

26. The portable device of claim 19, wherein the antenna comprises a plurality of antennas.

27. At least one non-transitory computer-readable medium having instructions recorded thereon, the instructions configured to have one or more processors perform a method of compensating for antenna mismatch, the method comprising:
  providing a test sweep signal as digital input to a Digital-to-Analog Converter (DAC) in a transmit path which ends with an antenna configured to transmit a signal;
  determining a transmit transfer function based on the digital input signal and a digital output signal, the digital output signal being output from an Analog-to-Digital Converter (ADC) receiving output from a variable amplifier, wherein a loopback path electrically connected in parallel with a load impedance of the antenna comprises the ADC and the variable amplifier;
  determining, based on the determined transmit transfer function, a change in transmission power to compensate for antenna mismatch; and
  compensating for antenna mismatch by controlling the transmitter amplifier to amplify the signal to be transmitted by the antenna in accordance with the determined change in transmission power,
  wherein the change in transmission power is determined:
    by determining a back-off power change needed to achieve a target Error Vector Magnitude (EVM) based on the determined transmit transfer function, a relationship between the EVM for an input power being identified based on the determined transfer function, the EVM increasing as the input power increasing, and the back-off power change being determined such that the EVM does not exceed the target EVM when the input power is maximum; or
    by looking up, in a pre-stored look-up table, a transmission power change corresponding to the determined transmit transfer function; or
    by determining, based on one or more compression points calculated based on the determined transfer function, the change in transmission power based on a difference between a target compression point and a measured compression point.

28. A system comprising the at least one non-transitory computer-readable medium of claim 27.

* * * * *